(12) United States Patent
Reibke et al.

(10) Patent No.: US 10,476,247 B2
(45) Date of Patent: Nov. 12, 2019

(54) CABLE-GUIDING ELEMENT

(71) Applicant: Phoenix Contact GmbH & Co. KG, Blomberg (DE)

(72) Inventors: Heinz Reibke, Bad Salzuflen (DE); Kevin Berghahn, Blomberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 15/767,207

(22) PCT Filed: Oct. 4, 2016

(86) PCT No.: PCT/EP2016/073620
§ 371 (c)(1),
(2) Date: Apr. 10, 2018

(87) PCT Pub. No.: WO2017/076560
PCT Pub. Date: May 11, 2017

(65) Prior Publication Data
US 2019/0027910 A1 Jan. 24, 2019

(30) Foreign Application Priority Data
Nov. 4, 2015 (DE) .................. 10 2015 118 903

(51) Int. Cl.
| H02G 3/04 | (2006.01) |
| F16L 3/12 | (2006.01) |
| F16L 3/20 | (2006.01) |
| F16L 3/23 | (2006.01) |

(52) U.S. Cl.
CPC .......... H02G 3/0481 (2013.01); F16L 3/1222 (2013.01); F16L 3/1226 (2013.01);
(Continued)

(58) Field of Classification Search
CPC .. H02G 3/0481; H02G 3/0418; H02G 3/0437; F16L 3/1222; F16L 3/23; F16L 3/20; F16L 3/1226
(Continued)

(56) References Cited

U.S. PATENT DOCUMENTS

| 376,617 A | * | 1/1888 | Vance ..................... F21V 21/02 362/457 |
| 567,550 A | * | 9/1896 | Petereit .................. F16M 13/02 248/282.1 |

(Continued)

FOREIGN PATENT DOCUMENTS

DE          297 02 047 U1     6/1997

*Primary Examiner* — Muhammad Ijaz
(74) *Attorney, Agent, or Firm* — David S. Safran; Roberts Mlotkowski Safran Cole & Calderon, P.C.

(57) ABSTRACT

A cable-guiding element for guiding electrical conductors having at least two cable channel elements, wherein the cable channel elements are pivotably connected to one another. For the cable-guiding element, the insertion and removal of conductors into the cable-guiding element is thus possible in a very easy way, such that the first cable channel element has an articulated head at a first end and the second cable channel element has a corresponding articulated socket on a first end, such that the first end of the first cable channel element and the first end of the second cable channel element form a joint, via which the cable channel elements are connected to one another, such that the joint has a channel for passing the conductors through, and such that a recess is formed in the joint and extends across the entire length of the joint.

11 Claims, 9 Drawing Sheets

(52) U.S. Cl.
CPC .................................. *F16L 3/20* (2013.01); *F16L 3/23* (2013.01); *H02G 3/0418* (2013.01); *H02G 3/0437* (2013.01)

(58) Field of Classification Search
USPC ................ 248/280.11, 282.1, 544, 585, 68.1
See application file for complete search history.

(56) References Cited

U.S. PATENT DOCUMENTS

| | | | | |
|---|---|---|---|---|
| 999,283 A * | 8/1911 | White | ................... | F16M 13/02 248/282.1 |
| 7,540,457 B2 * | 6/2009 | Oddsen, Jr. | .......... | F16M 11/105 248/278.1 |
| 7,677,515 B2 * | 3/2010 | Oddsen, Jr. | ........ | F16M 11/2014 248/274.1 |
| 8,424,822 B2 * | 4/2013 | Suda | ..................... | F16M 11/08 248/131 |
| 8,450,645 B2 | 5/2013 | Gelmetti | | |
| 9,706,843 B2 * | 7/2017 | Hung | ................... | F16M 11/105 |
| 2005/0121577 A1 * | 6/2005 | Oddsen, Jr. | ............ | F16M 11/10 248/225.11 |
| 2008/0001866 A1 * | 1/2008 | Martin | ................... | F16M 11/10 345/84 |
| 2013/0119219 A1 * | 5/2013 | Mifsud | ................ | F16M 13/022 248/276.1 |
| 2014/0367137 A1 * | 12/2014 | Leung | ................... | H02G 3/045 174/68.3 |
| 2018/0216753 A1 * | 8/2018 | Hughes | ..................... | F16L 3/10 |
| 2019/0027910 A1 * | 1/2019 | Reibke | ................ | H02G 3/0481 |

* cited by examiner

CABLE-GUIDING ELEMENT

BACKGROUND OF THE INVENTION

Field of the Invention

The invention relates to a cable guiding element for guidance of electrical lines, with at least two cable channel elements, the cable channel elements being pivotally connected to one another.

Description of Related Art

Cable guiding elements of the initially mentioned type are always used when individual lines or in general a plurality of electrical lines must be routed over a distance. In the prior art these cable guiding elements which are made in the form of support arms are used for swiveling devices such as electrical or medical devices.

Thus, German Patent Application DE 297 02 047 01 discloses a support arm by which electrical lines are guided. The support arm consists of two component arms and one arm intermediate piece which are connected to one another by a joint, the electrical lines being guided through the joint. The component arms in the region of the joint are equipped with a removable cover, while the arm intermediate piece is equipped on its top entirely with a removable cover. The covers must be dismounted for insertion of the electrical lines and the lines must be entered into the support arm by their having to be threaded through the joints.

U.S. Patent Application Publication US 2013/0119219 A1 discloses a cable guiding element in the form of a support arm. The support arm consists of several component arms which are each connected to one another by joints. The electrical lines are entered into the support arm by their being threaded through the individual support arms. In the region of the joints the support arms have removable covers which must be removed in order to enable threading.

To date the use of such cable guiding elements in switchgear cabinets has not been known from the prior art, although many electrical lines must often be guided here. In many switchgear cabinets, electrical functional units are placed on the door of the switchgear cabinet so that the electrical connections between the components on the door of the switchgear cabinet and the components in the switchgear cabinet must be flexible. In practice, it is conventional to join individual cables together using a helical belt or a hose from a cable harness and to install them in a large loop as a switchgear cabinet door connection. This approach is disadvantageous by itself due to the fact that the cable harness can stick or components in the switchgear cabinet can be unintentionally activated. Another disadvantage is the large amount of space required and the circumstance that the movement of the cable harness when the switchgear cabinet door is being opened and closed is not defined. Likewise, tightening of individual lines is difficult or complex. To do this, under certain circumstances the entire structure must be dismounted and the lines combined into a new cable harness.

The cable guiding elements which are known from the prior art are of only very limited suitability for use in switchgear cabinets, in particular because the known support arms are not designed to favor practical, simple and comfortable replacement of cables. Nor is this provided in the known support arms which are designed primarily to pivotally connect devices or parts of devices to one another.

SUMMARY OF THE INVENTION

Therefore, the object of the invention is to devise a cable guiding element which is especially well suited for use in switchgear cabinets and in which replacement, addition or removal of individuals lines is easily possible.

This object is achieved in the initially described cable guiding element in that a first cable channel element on one first end has an articulated head and a second cable channel element on one first end has a corresponding articulated socket so that the first end of the first cable channel element and the first end of the second cable channel element form a joint via which the cable channel elements are connected to one another. Here, the joint has one channel for passage of the lines. Moreover, in the joint a recess is made which extends over the entire length of the joint.

The cable guiding element according to the invention is characterized, first of all, in that one joint is very elegantly implemented without additional parts by the articulated socket and the articulated head each being made on one end of one cable channel element at a time. The configuration of the articulated head as a pipe segment is especially advantageous. The corresponding articulated socket is then made as an open ring so that it can be slipped onto the pipe segment. To do this, the pipe segment preferably has a groove into which the ring-shaped articulated socket is taken. The width of the groove corresponds essentially to the width of the articulated socket so that the articulated socket has only little or no play along the longitudinal axis of the joint when it is connected to the articulated head. The longitudinal axis of the joint corresponds to the axis of rotation of the joint here.

The joint has a channel for passage of the electrical lines so that the lines from the first cable channel element to the second cable channel element can be guided through the entire joint. If the articulated head is made as a pipe segment, the channel is then likewise implemented by the pipe segment.

According to the invention, a recess is made in the joint which extends over the entire length of the joint. Because the recess extends over the entire length of the joint, electrical lines can be easily guided through the recess into the joint. Later insertion of electrical lines can also be easily accomplished. Likewise, individual or all lines can also be very easily let out of the joint again and thus also out of the cable guiding element, since it is not necessary to thread the lines through the joint.

Over its entire length the recess preferably has a constant width, and the recess can be arranged in different ways. Preferably, the recess extends parallel to the longitudinal axis of the joint. Another possibility is that the recess extends at an angle to the longitudinal axis of the joint, the recess then being aligned such that it does not run opposite to the extension direction of the inserted lines. But what is important is only that the recess extend over the entire length of the joint so that the lines can be inserted into the joint from the side through the recess and need not be passed through the joint.

The width of the recess, on the one hand, must be matched to the thickness of the cable which is to be passed through or the lines which are to be passed through. It is advantageous to make the recess so wide that the lines can be guided through the recess without difficulty. On the other hand, it is recommended that the recess be made as narrow as possible in order not to adversely affect the stability of the joint and in order to reduce the risk of the lines which have been guided in the channel from slipping out.

So that, when the cable guiding element is moving, hooking of the electrical lines to the recess does not occur, and in order to prevent the electrical lines or individual electrical lines from slipping out of the recess, according to one preferred configuration of the cable channel element according to the invention, there is a closing element for closing of the recess. The cable guiding element thus has at least two cable channel elements and one closing element for the recess in the joint which has been formed between the two cable channel elements. The closing element can be configured in different ways. According to one simple configuration, the closing element is made as a separate part which is connected, in particular locked, to the joint only for closing the recess. When the recess is being opened, the closing element is thus removed from the recess so that it is no longer connected to the joint.

According to one especially preferred configuration of the cable guiding element, the closing element even in the opened state of the recess is connected to the joint, for which the closing element can be made as a slider or swivel part. It is advantageous here that the closing element cannot be lost when the recess is being opened, and the recess can be closed immediately after insertion of the cable.

A configuration in which the closing element is made as a rotating crank has proven especially advantageous. This configuration is especially well suited when the articulated head is made as a pipe segment. The rotating crank is then likewise made as a pipe segment, the outside diameter of the rotating crank being chosen such that the rotating crank is guided in the articulated head with as little play as possible, the outside diameter of the rotating crank and the inside diameter of the articulated head are thus almost identical. The rotating crank is rotated around the longitudinal axis of the articulated head, therefore also around the axis of rotation of the joint. The rotating crank has an opening which is at least as wide as the recess of the joint.

Moreover, on the closing element made as a rotating crank preferably one actuating lever is made or located with which a user can turn the rotating crank in the articulated head, and thus, can especially easily open and close the recess. In the articulated head, for this purpose, a slot is made in which the actuating lever is guided. In order to prevent unintentional opening of the rotating crank, the rotating crank can have a projection. When the rotating crank is rotating, the projection moves along the joint and locks in an end position. For this purpose, the articulated head has an elevation on one side so that the rotating crank can be locked.

Cable guiding elements are in particular advantageous when a plurality of cables have to be guided. Preferably, in the cable guiding element according to the invention, therefore, at least one cable channel element has at least one holder and/or a hole for fixing the lines. If the cable channel element has at least two holes, for example one cable binder can be guided through the holes so that the lines can be fastened on the cable channel element with the cable binder. In this way grouping of the lines is also possible. By grouping or separating the lines tangling can be avoided. The grouping of lines also facilitates the later replacement of individual lines. Besides via cable binders, the lines can also be directly attached to corresponding holders in the cable channel element, there being different possibilities in the configuration of the holders. For example, in particular closable hooks can be fastened on the cable channel element in which the lines can be hooked.

In addition to its first end, each cable channel element has a second end. One preferred configuration of the cable guiding element according to the invention is characterized by the cable channel elements on their second end having an articulated socket or an articulated head. Accordingly, there can be cable channel elements which on their first end have an articulated head and on their second end an articulated socket as well as cable channel elements which on their first end have an articulated socket and on their second end an articulated head. In addition, there can also be cable channel elements which on their first and on their second end each have one articulated socket, and cable channel elements which have one articulated head each on their first and on their second end.

This configuration is especially advantageous because, in this way, several cable channel elements can be very easily joined to one another. Cable guiding elements of any length can be assembled from a plurality of cable channel elements. Thus, the cable guiding element can be optimally matched in its length to the application site. During assembly, one end of a cable channel element which has an articulated head is always connected to one end of another cable channel element which has an articulated socket.

In a cable guiding element having two cable channel elements, for example, the first cable channel element on its first end can have one articulated head and on its second end can have an articulated socket, while the second cable channel element on its two ends has one articulated socket each. The cable guiding element then has one articulated socket on each of its two free ends. Alternatively, two cable channel elements can also be used which each have one articulated head on one end and one articulated socket on another end. To lengthen the cable guiding element, for example, on one free end of the cable guiding element, another cable channel element can be fastened which on its first end has an articulated head so that the cable guiding element then has two joints.

According to one preferred configuration of the cable guiding element according to the invention, there is at least one cable channel end piece, the cable channel end piece having one articulated head or one articulated socket. If the cable channel end piece has an articulated head, the cable channel end piece and the second end of a cable channel element which has an articulated socket then together form a joint via which the cable channel end piece and the cable channel element are connected to one another. If the cable channel end piece conversely has an articulated socket, then the cable channel end piece and the second end of a cable channel element which has an articulated head together form a joint via which the cable channel end piece and the cable channel element are connected to one another. In this joint one channel for passage of the lines and in the joint one recess which extends over the entire length of the joint are also made.

Preferably, the cable guiding element has two cable channel end pieces so that the cable guiding element on the two ends is enclosed by one cable channel end piece. The two cable channel end pieces then each form a joint with the bordering free end of one cable channel element. If the cable channel end piece according to one preferred configuration of the cable guiding element has a mounting section, the cable guiding element can be easily fastened with its two ends, i.e., with the mounting sections of the two cable channel end pieces, to its application site, for example, to the door of a switchgear cabinet and to a suitable site within the switchgear cabinet.

The cable channel end piece which has an articulated head is made preferably analogously to the articulated head of the first cable channel element, specifically is formed by a pipe segment. Thus, the configurations made with respect to the articulated head of the first cable channel element, such as, for example, providing a closing element, apply accordingly to the cable channel end piece. In particular, in the cable channel end piece there can also be one closing element which is made preferably as a rotating crank. The cable channel end piece which has an articulated socket is made preferably according to the articulated socket of the second cable channel element.

The mounting section of the cable channel end piece can be made in different ways. Preferably, the mounting section is made as a flange. The flange can then have latch elements or one or more holes for screws for mounting of the cable guiding element. The mounting section itself can be made integrally with the cable channel end piece, for example as an injection molded plastic part. But, it is also conceivable for the mounting section to be made as a separate part and to be connected to the cable channel end piece.

In order to protect lines guided in the cable guiding element against damage and/or dirt and dust, according to another preferred configuration of the cable guiding element according to the invention, it is provided that at least one cable channel element has a cover, the cover extending over the entire length of the cable channel element. Preferably, each cable channel element of the cable guiding element has a cover to cover the lines over the entire length of the cable guiding element and to protect against damage. In one configuration, the cover is fastened to the cable channel element, for example, by hinges, so that the cover must be "clicked shut" for closing. A configuration is likewise conceivable and preferable in which the cover is slipped onto the cable channel element for covering the lines, while in the opened state it is not connected to the cable channel element. Then, preferably, the cable channel element and the cover have latch elements which correspond to one another so that the cover can be reliably fastened to the cable channel element.

The cable channel elements, also in the covered state, can partially oscillate over one another due to the inventive configuration of the cable guiding element and because the lines are guided through all joints, as a result of which high flexibility of the cable guiding element is ensured. Here, the lines are always reliably guided on or in the cable guiding element so that damage to the lines, in particular in the covered state, is avoided.

In particular, at this point here are various possibilities for configuring and developing the cable guiding element according to the invention as will be apparent from the description of preferred embodiments in conjunction with the accompanying drawings.

DETAILED DESCRIPTION OF THE INVENTION

Figure 1:
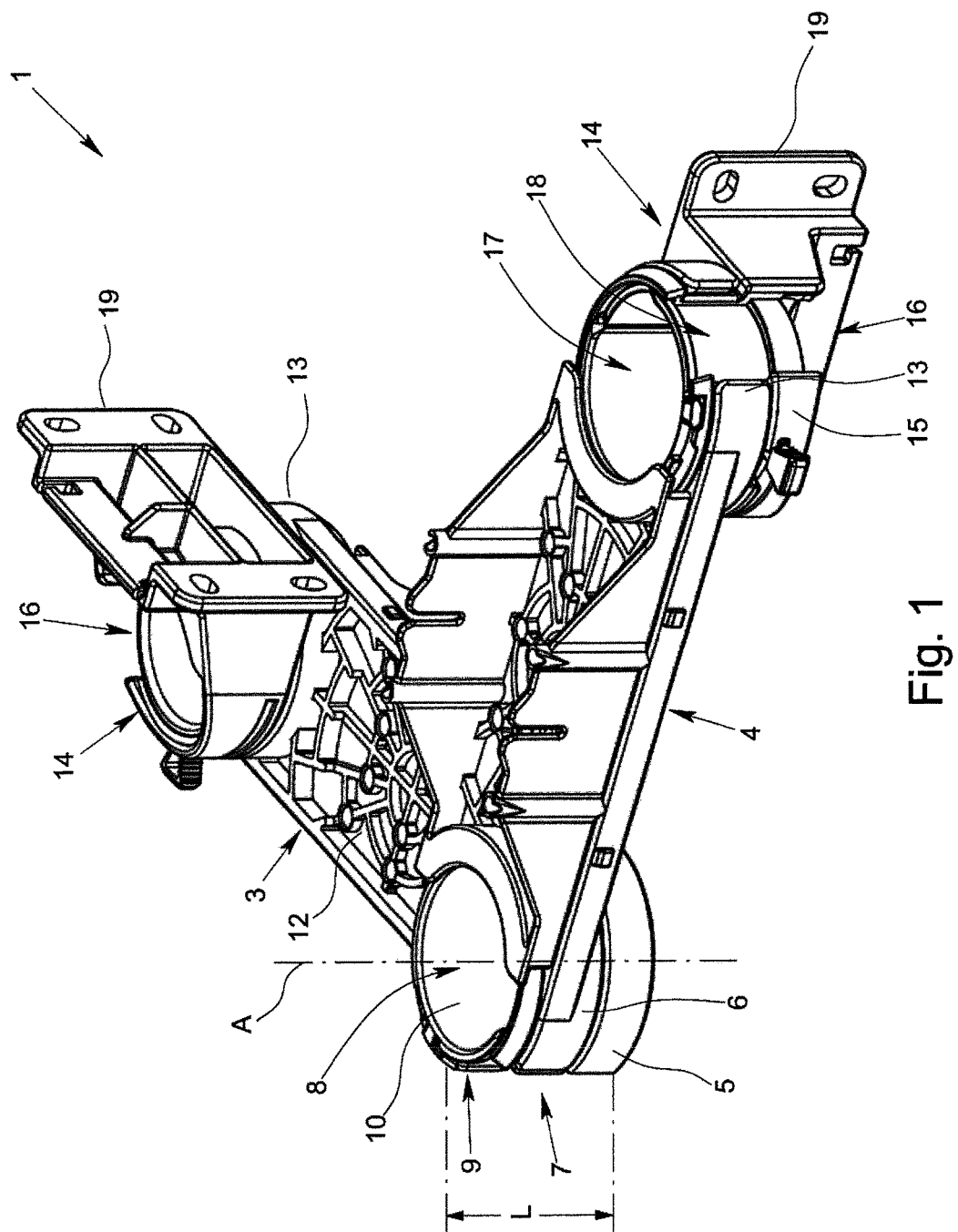
FIG. 1 shows one exemplary embodiment of a cable guiding element according to the invention, in the opened state.
Figure 7:
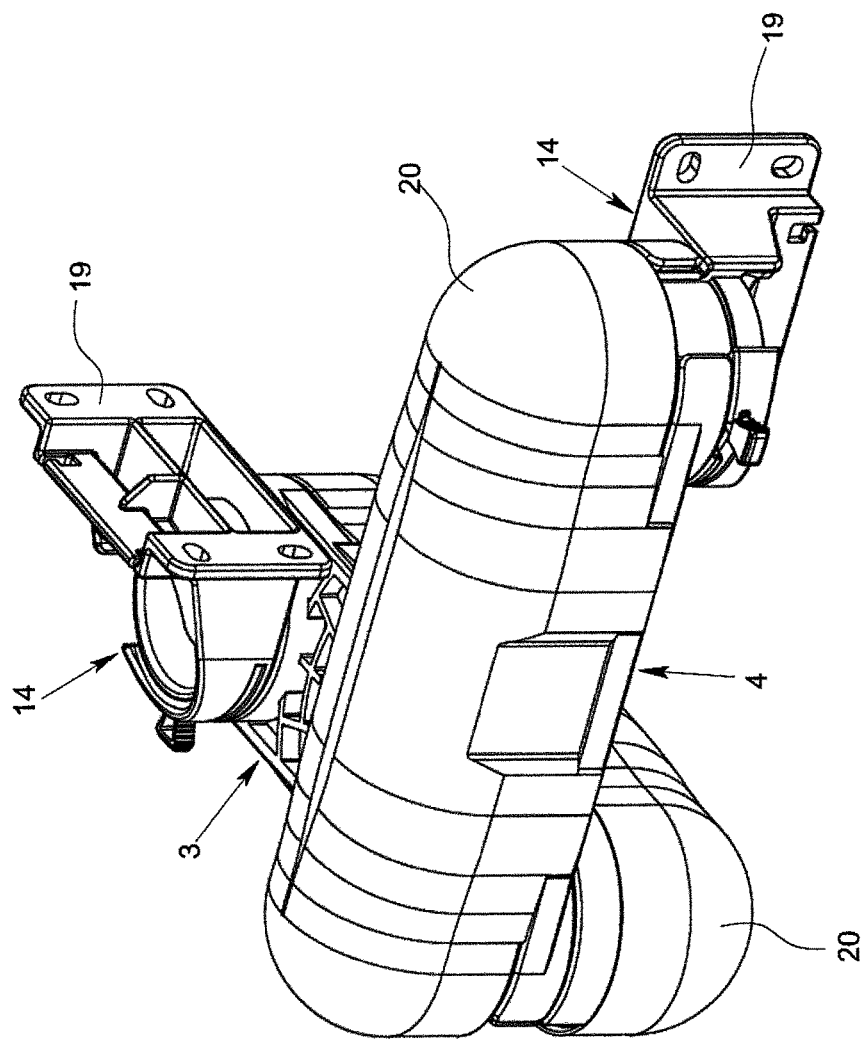
FIG. 7 shows the cable guiding element according to FIG. 1 in the state closed with covers.

FIG. 1 shows a cable guiding element 1 according to the invention in the opened state. The same cable guiding element 1 is shown in FIG. 7 in the closed state and in FIG. 8 with the lines 2 inserted.

Figure 2:
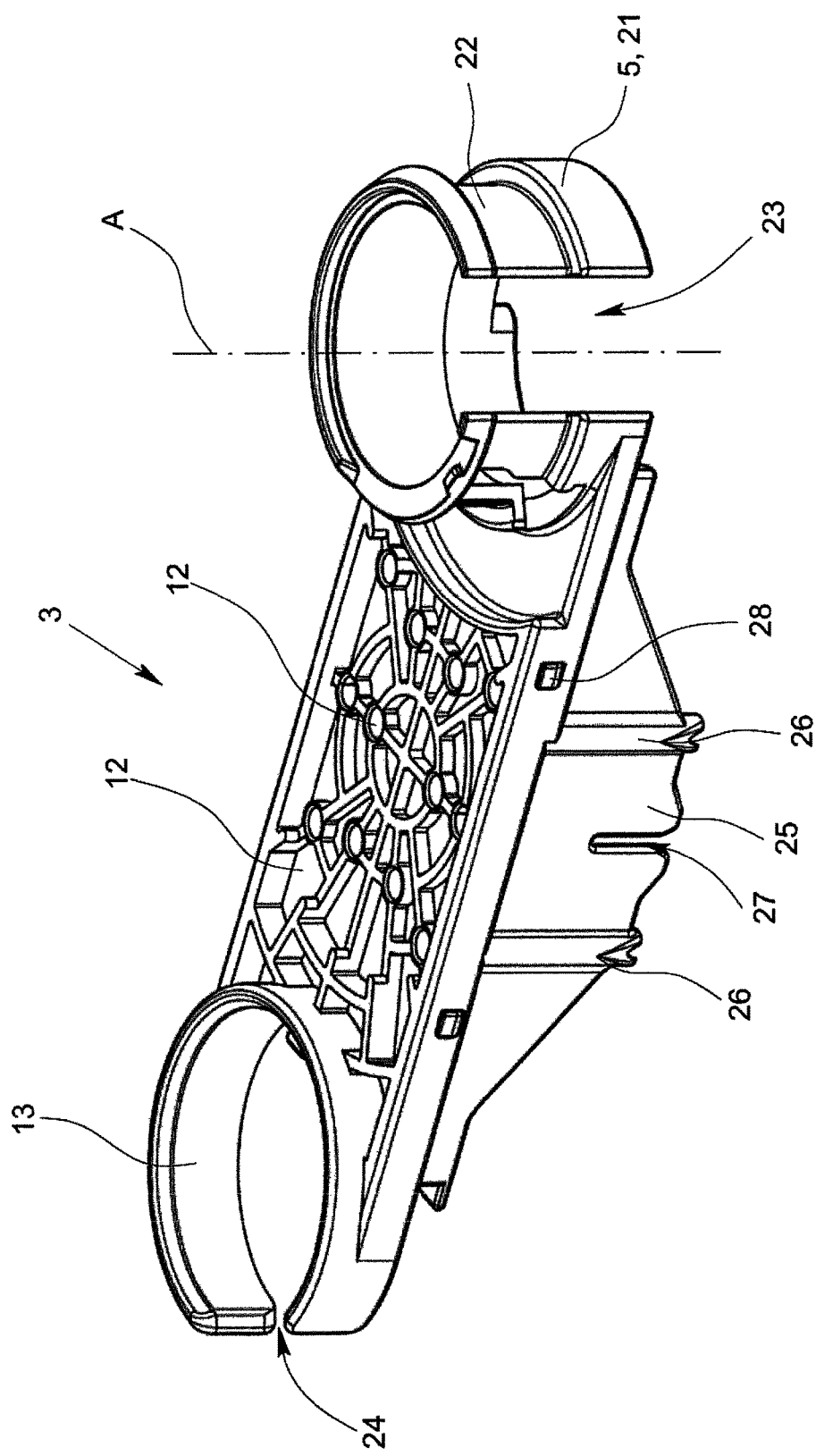
FIG. 2 shows the first cable channel element of the cable guiding element according to FIG. 1.
Figure 3:
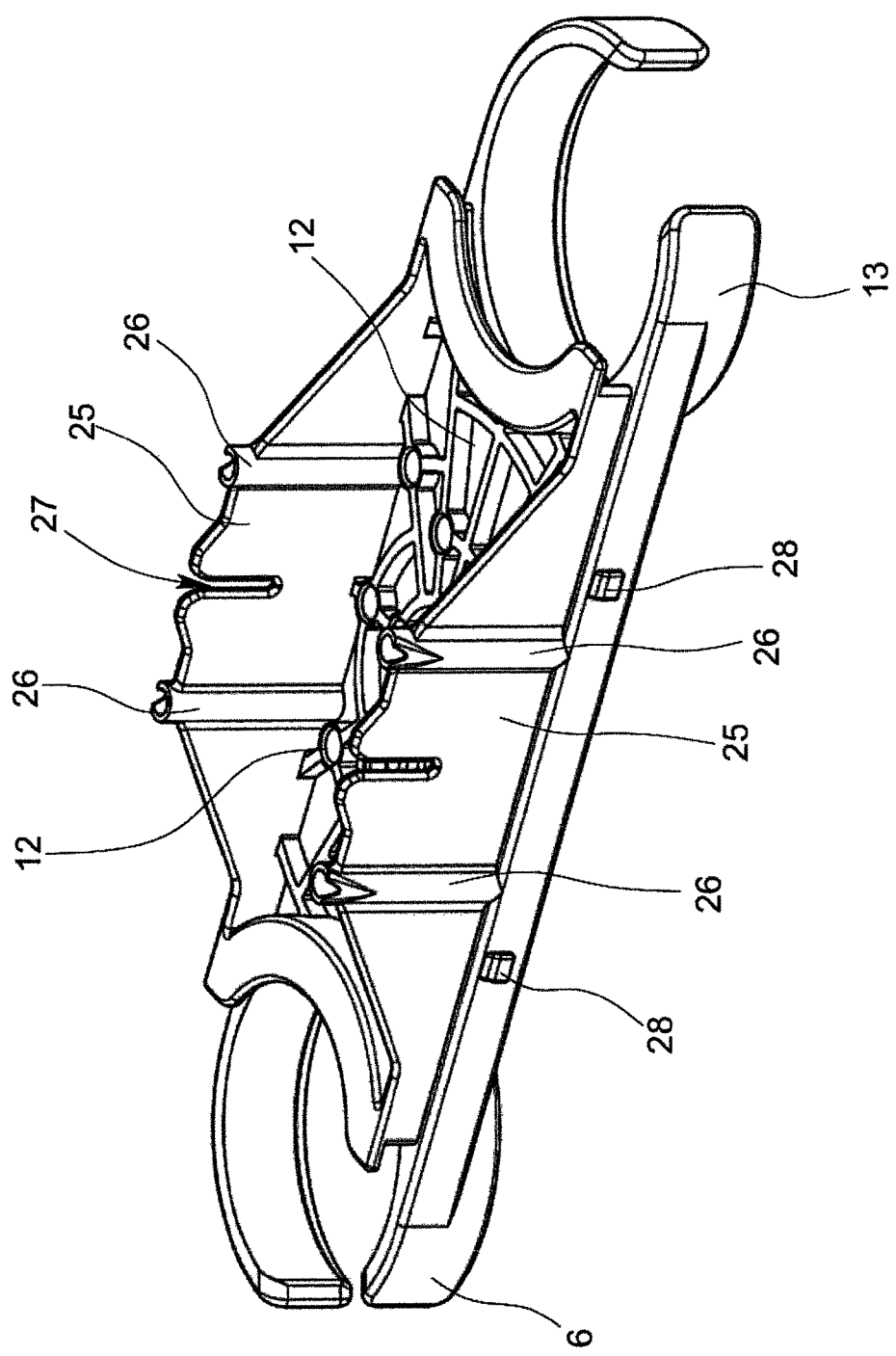
FIG. 3 shows the second cable channel element of the cable guiding element according to FIG. 1.

The cable guiding element 1 has a first cable channel element 3 and a second cable channel element 4 which are shown respectively for themselves in FIGS. 2 and 3. The first cable channel element 3 on its first end has one articulated head 5 and the second cable channel element 4 on its first end has a corresponding articulated socket 6. The first end of the first cable channel element 3 and the first end of the second cable channel element 4 thus form a joint 7 via which the two cable channel elements 3, 4 are pivotally connected to one another. FIG. 1 shows the bottom of the first cable channel element 3 and the top of the second cable channel element 4.

The joint 7 forms a channel 8 by which electrical lines 2 (FIG. 8) can be guided from the first cable channel element 3 through the joint 7 to the second cable channel element 4. In order to simplify insertion, in particular a later insertion, and removal of electrical lines 2, the joint 7 of the cable guiding element 1 has a recess 9 which extends over the entire length L of the joint 7 and through which the lines 2 can be laterally let in and out without the lines 2 with their entire length having to be passed through the joint 7. As is also apparent from FIG. 1, the length L is the extension of the joint 7 along its longitudinal axis A which corresponds to the axis of rotation of the joint 7 in the illustrated cable guiding element 1.

So that the electrical lines 2 or separate electrical lines are prevented from unintentionally disengaging or slipping out, in the cable guiding element 1, there is a closing part which is made as a rotating crank 10 in the illustrated exemplary embodiment. FIG. 1 shows the cable guiding element 1 in which the recess 9 in the joint 7 is closed by the rotating crank 10.

The second end of the first cable channel element 3 and the second end of the second cable channel element 4 are each made as an articulated socket 13, in the articulated socket 13 there being a cable channel end piece 14 with an articulated head 15. The articulated sockets 13 on the second end of the cable channel elements 3, 4 and the articulated heads 15 of the cable channel end pieces 14 each form a joint 16 so that the cable channel end pieces 14 are each pivotally connected to the cable channel elements 3, 4. In the same manner as the joint 7, the joints 16 have a channel 17 for passage of electrical lines 2 and a recess 18, the recess 18 extending over the entire length of the joints 16 and being used for letting the electrical lines 2 in and out. Moreover, the cable channel end pieces 14 have mounting sections 19 with which the cable guiding element 1 can be fastened to its application site.

The individual components of the cable guiding element 1 which are shown in FIG. 1 are explained in detail below with reference to FIGS. 2 to 6.

FIG. 2 shows the first cable channel element 3 of the cable guiding element 1 according to the invention which is shown in FIG. 1. In the perspective which was chosen in FIG. 2, the bottom of the first cable channel element 3 is visible. The cable channel element 3 on its first end has one articulated head 5 and on its second end one articulated socket 13. The articulated head 5 is made as a pipe segment 21 with the longitudinal axis A. The pipe segment 21 over its periphery has a groove 22 which is used to accommodate the articulated socket 6. The width of the groove 22 is matched to the width of the articulated socket 6 which is to be accommodated so that the articulated socket 6 has as little play as possible or no play in the direction of the longitudinal axis A of the pipe segment 21. Moreover, the pipe segment 21 has an opening 23 which constitutes part of the recess 9 of the joint 7 of the cable guiding element 1.

The articulated socket 13 is made annular and has an opening 24 which is used for simple connection of the articulated socket 13 to a corresponding articulated head of another first cable channel element or of the articulated head 15 of a cable channel end piece 14. To connect the articulated socket 13 to the articulated head, the articulated socket 13 is slipped onto the articulated head, for which a suitable bevel is made on the articulated head.

The middle part of the first cable channel element 3 has holes 12 which are made in the bottom of the first cable channel element 3. Cable binders or similar elements which are not shown and with which electrical lines 2 can be fixed on the cable channel element 3 can be guided through the holes 12. The holes 12 extend over the entire middle part of the first cable channel element 3 so that for the case in which a host of electrical lines are being guided through the cable guiding element 1 the lines 2 can be grouped or roughly sorted. The middle part of the first cable channel element 3 is made as a simple rail. Laterally the rail is bordered by walls 25 which likewise assume the function of a holder for accommodating a cover 20. For guiding and fastening the cover 20 the walls 25 have guide rails 26 and recesses 27. Using the latch projections 28 the cover 20 is locked on the rail so that it is reliably fastened.

FIG. 3 shows the second cable channel element 4 of the cable guiding element 1 according to the invention which is shown in FIG. 1. In the perspective of FIG. 3, the top is recognizable. The second cable channel element 4 differs from the first cable channel element 3 which is shown in FIG. 2 in that an articulated socket 6 is made on the first end of the second cable channel element 4. The middle part of the second cable channel element 4 is made identically to the middle part of the first cable channel element 3, therefore likewise has holes 12 and two side walls 25 which have guide rails 26, a recess 27 and latch projections 28 for fastening to a cover 20.

In order to implement a cable guiding element 1 of any length, a host of first cable channel elements 3 can be connected to one another and to a second cable channel element 4. A termination is then formed preferably by a second cable channel element 4 so that on the two ends of the cable guiding element 1 one articulated socket 13 is made which can each be connected to a cable channel end piece 14. But fundamentally it is also possible to connect two cable channel elements 3 according to FIG. 2 to one another, then the articulated head 5 of one cable channel element 3 with the articulated socket 13 of the other cable channel element 3 being connected to one another to form a joint 7.

Figure 4:
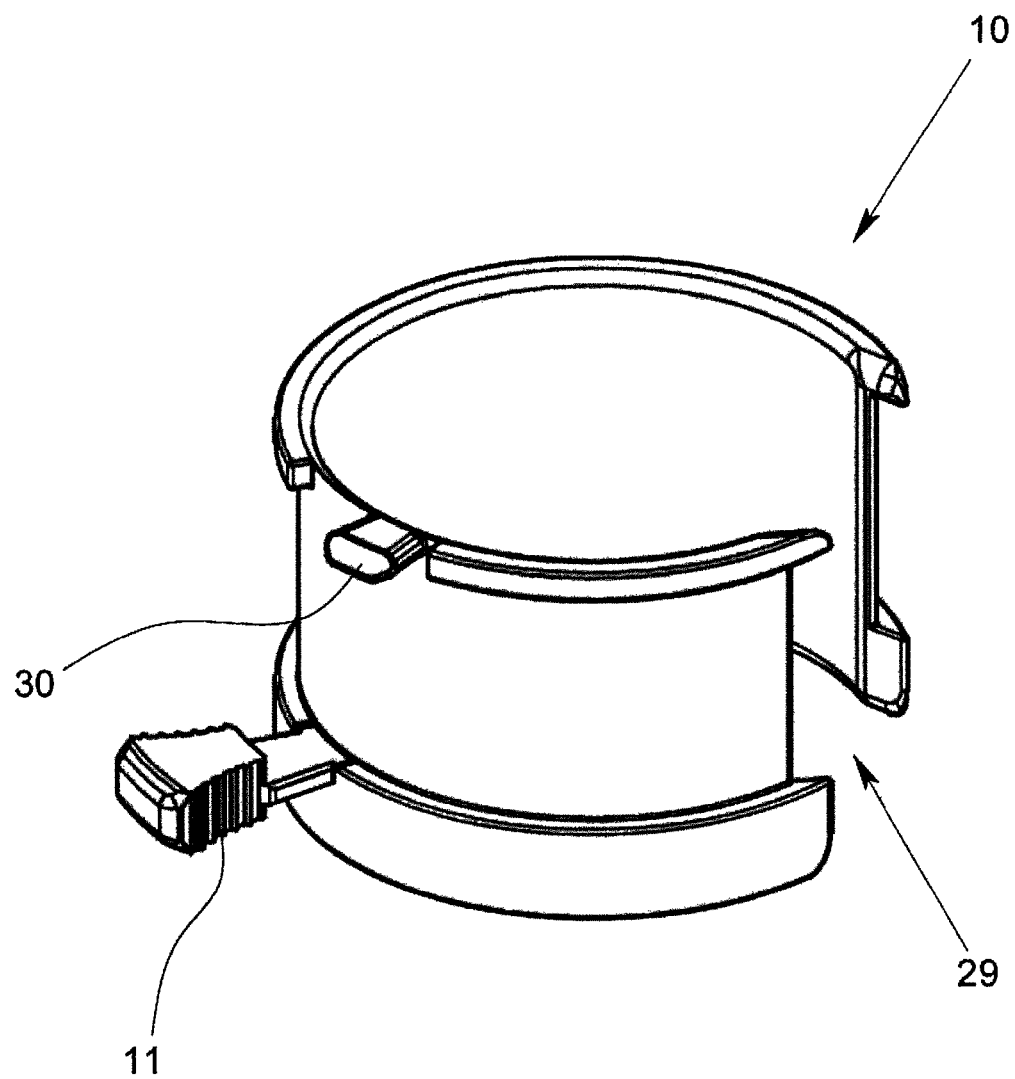
FIG. 4 is an enlarged view of a closing element.

FIG. 4 shows a closing element made as a rotating crank 10 which is located in the joints 7, 16 of the cable guiding element 1.

The rotating crank 10 is made as a pipe segment and has an opening 29 through which the electrical lines 2 can be inserted in the state mounted in the joint. The opening 29 in the installed and opened state of the rotating crank 10 thus forms a part of the recess 9 of the joint 7. The rotating crank 10 has an actuating lever 11 with which the rotating crank 10 can be moved in the joint 7, 16 out of a position which clears the recess 9, 18 into a position which closes the recess 9, 18 and vice versa. Furthermore, the rotating crank 10 has a projection 30 with which the rotating crank 10 can be locked, as is described below.

Figure 5:
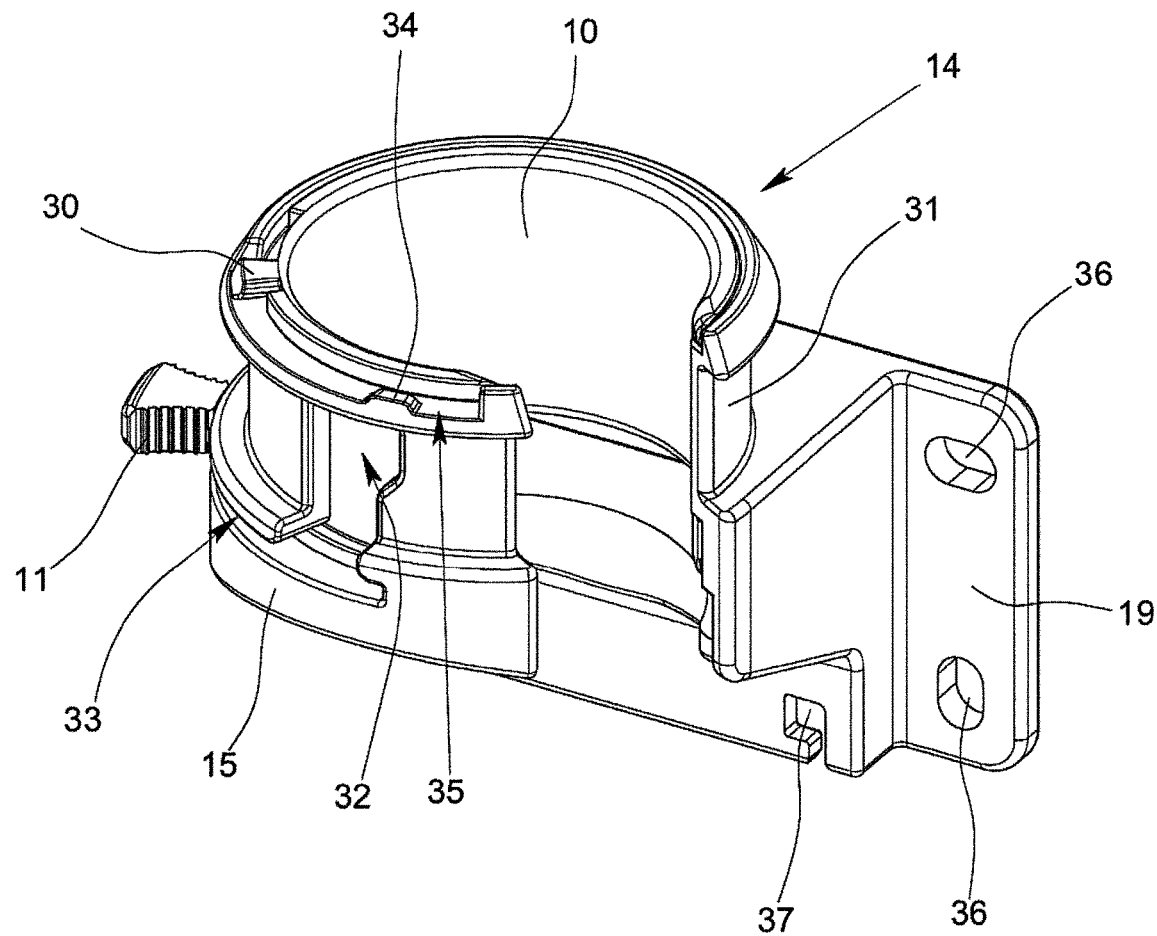
FIG. 5 shows a first exemplary embodiment of a cable channel end piece.
Figure 6:
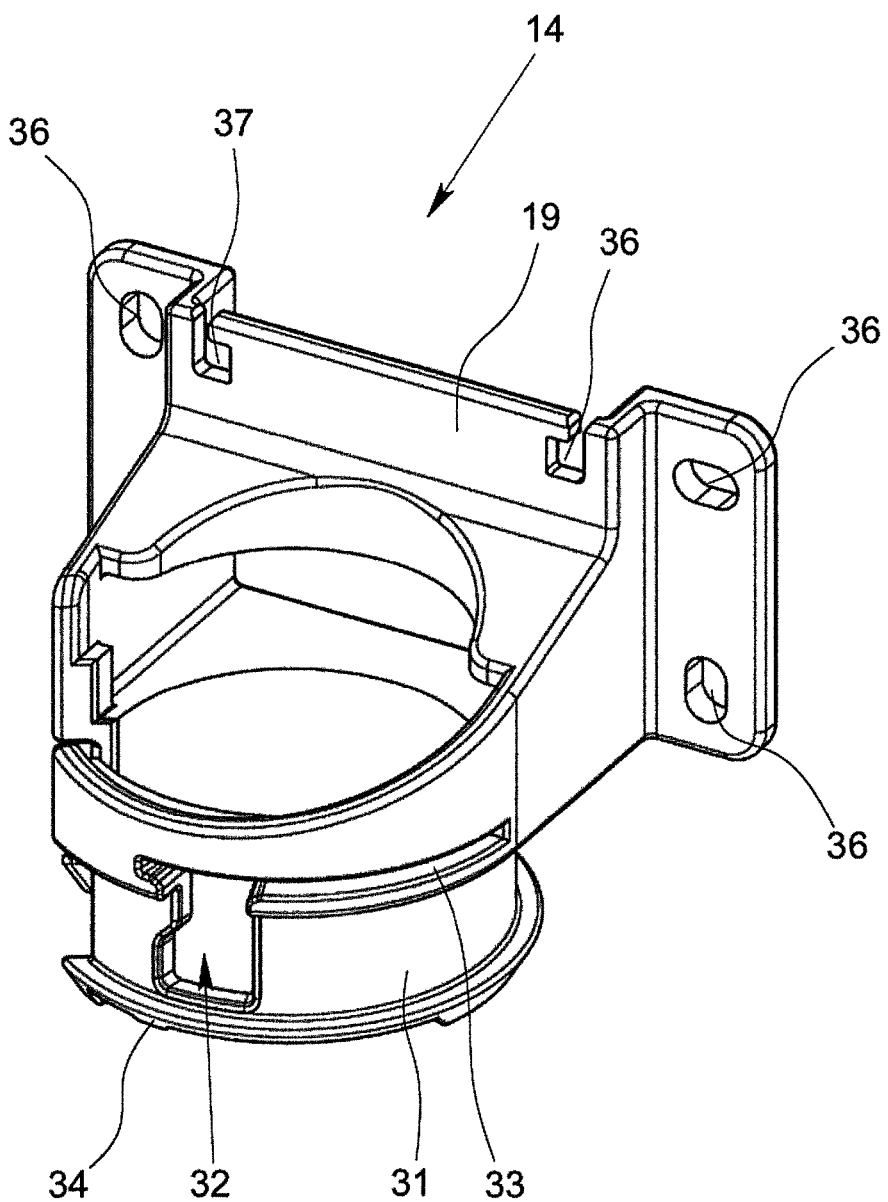
FIG. 6 shows a cable channel end piece according to FIG. 5, turned by 180°.

FIGS. 5 and 6 show a cable channel end piece 14 in which the rotating crank 10 is mounted. The cable channel end piece 14 has an articulated head 15 which is made as a pipe segment. The articulated head 15 of the cable channel end piece 14 is made identically to the articulated head 15 of the first cable channel element 3. The articulated head 15 has a groove 31 which is used to accommodate a corresponding articulated socket 13. The articulated head 15 has an opening 32 through which the actuating lever 11 is guided when the rotating crank 10 is being mounted. In the mounted state the actuating lever 11 of the rotating crank 10 is guided along a slot 33 in the articulated head 15 for turning the rotating crank 10 and thus for closing the recess. The opened state is shown in which the opening 29 in the rotating crank 10 clears the recess in the cable channel end piece 14. The articulated head 15 on its upper edge has an elevation 34. The projection 30 of the rotating crank 10 must be pushed over this elevation 34 if the rotating crank is to be moved into the closed state so that the projection 30 clicks in an end position 35. In order to open the recess 18 again, the projection 30 must be guided over the elevation 34 so that unintentional opening is prevented by this configuration.

The cable channel end piece 14 has one mounting section 19 with which the cable guiding element 1 can be attached at its application site. For this purpose, recesses 36 in the mounting section 19 are made through which, for example, screws can be guided. The mounting section 19 in the illustrated embodiment has two regions with two recesses 26 each which are located to the side of the articulated head 15. Furthermore, the cable channel end piece 15, which is shown in FIGS. 5 and 6, has two hook-shaped recesses 37 which are used to fasten cable binders so that the lines 2 can be fixed. The torsion of the lines 2 which arises when the cable channel elements 3, 4 are being swiveled is thus not transferred to the connection site of the lines on the electrical components so that the lines 2 are relieved in traction and rotation.

FIG. 7 again shows the cable guiding element 1 which is shown in FIG. 1, the cable guiding element 1 shown in FIG. 7 differing from the cable guiding element 1 shown in FIG. 1 in that in addition one cover 20 at a time is additionally fastened on one cable channel element 3, 4, and the cable guiding element 1 and in particular the receiving space for the lines 2 are thus closed. The cable channel elements 3, 4 each have a separate cover 20, the cover 20 extending over the entire length of the cable channel element 3, 4.

Figure 8:
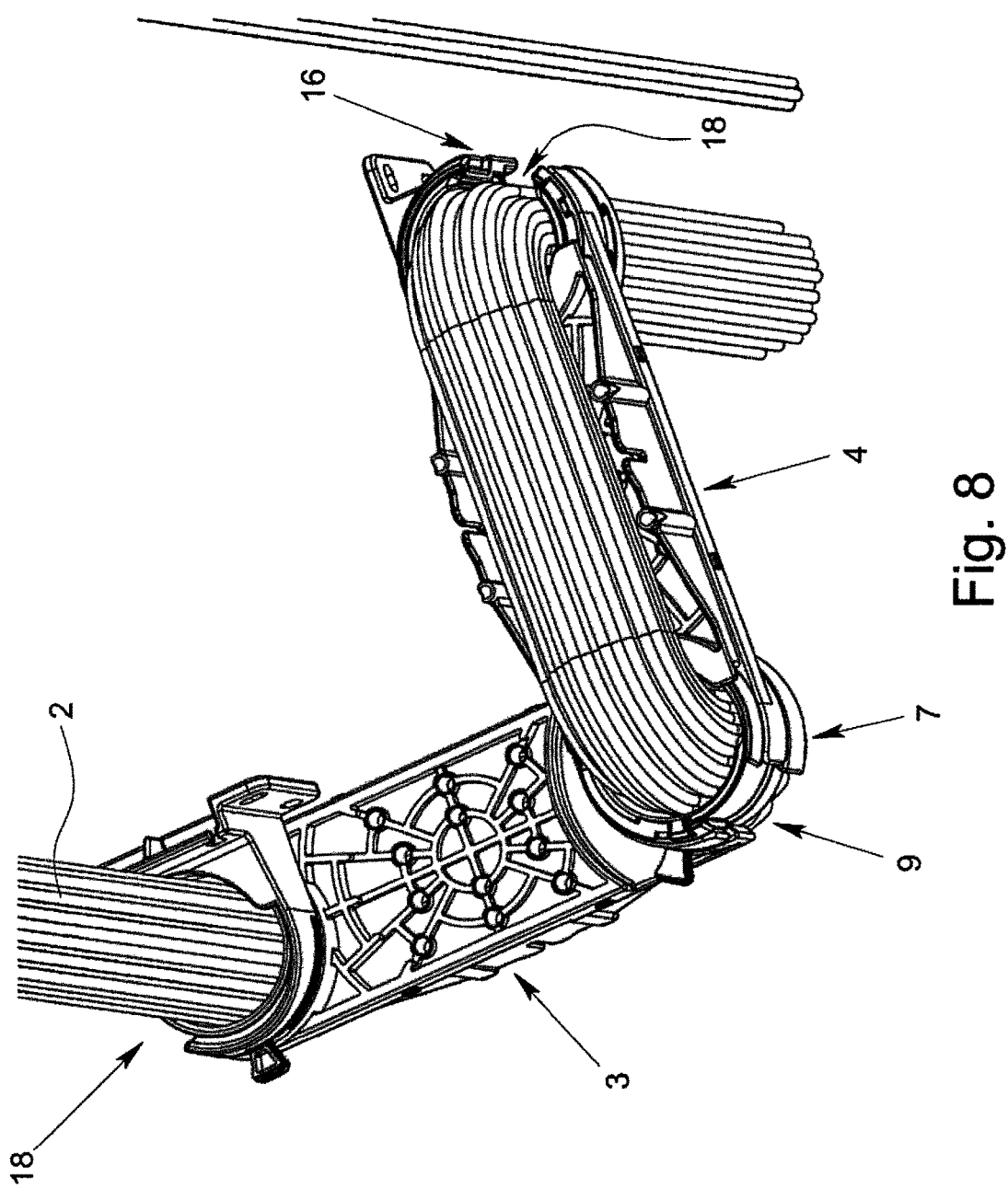
FIG. 8 shows the cable guiding element according to FIG. 1, with electrical lines

FIG. 8 shows the cable guiding element 1 equipped with lines 2, but without covers 20. The electrical lines 2 are let in or out from the side through the recesses 9, 18 into the joints 7, 16 of the cable guiding element 1 so that the lines 2 need not be passed through the entire cable guiding element 1, and in particular, the individual joints 7, 16. The joint 7 is in a closed state while the joint 16 is shown open.

Figure 9:
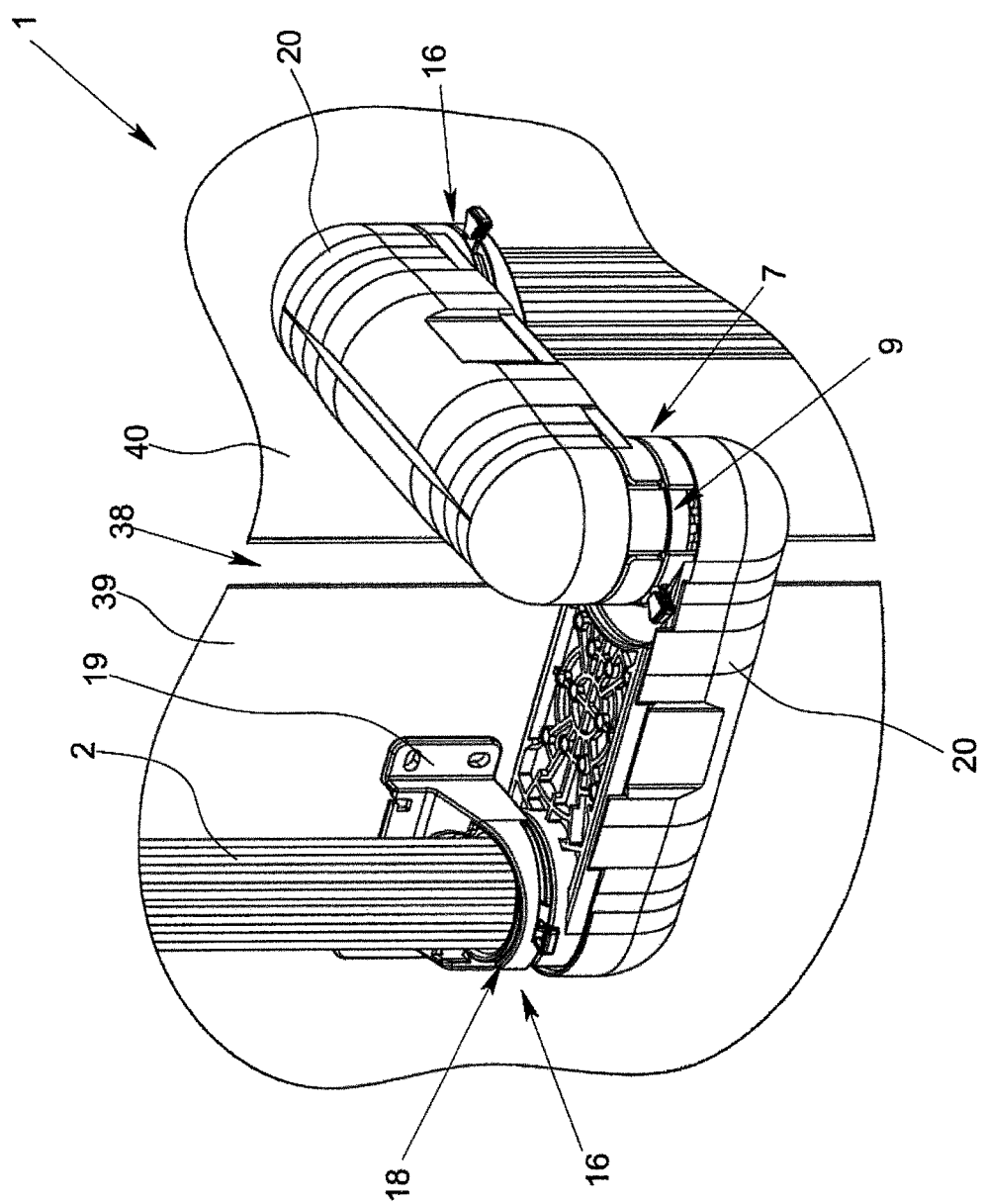
FIG. 9 shows the cable guiding element according to FIG. 7, with electrical lines, in the installed state.

FIG. 9 shows a cable guiding element 1 according to the invention in the installed state. In addition to the cable guiding element 1 which is closed with two covers 20 and which is outfitted with lines 2, a cutaway portion of a switchgear cabinet 38 with a switchgear cabinet wall 39 and a switchgear cabinet door 40 is shown. The cable guiding element 1 is attached with the mounting section 19 to the switchgear cabinet wall 39 and the switchgear cabinet door 40. Only the attachment to the switchgear cabinet wall 39 is visible. The electrical lines 2 are covered within the cable guiding element 1 by the two covers 20 and are thus protected against damage and fouling. Due to the joints 7, 16, the cable guiding element 1 has high flexibility and forms altogether a reliable and elegant approach to the guidance of electrical lines 2. The recesses 9, 18 of the joints 7, 16 are shown in the closed state. Thus, there is no risk that electrical lines 2 can be unintentionally forced out through the recesses 9 and jammed when swiveling.

In the cable guiding element 1 according to the invention, the electrical lines 2 can be very easily let in and out, even individual lines can be let in and out later without problems since passage of the lines 2 through the entire cable guiding element 1 or the individual joints 7, 16 is not necessary as a result of the recesses 9, 18. If necessary, the cable guiding element 1 can be lengthened by using one or more further cable channel elements 3, 4, and thus, can be easily adapted to the respective application site.

What is claimed is:

1. A cable guiding element for guidance of electrical lines, comprising:
   at least two cable channel elements, the at least two cable channel elements being pivotally connected to one another,
   wherein a first end of a first cable channel element of the at least two cable channel elements has an articulated head and a first end of a second cable channel element of the at least two cable channel elements has a corresponding articulated socket so that the first end of the first cable channel element and the first end of the second cable channel element form a joint via which the at least two cable channel elements are connected to one another, the joint having a channel extending from a first side of the at least two channel elements to an opposite second side of the at least two channel elements for passing electrical lines axially through the channel from the first side of the at least two channel elements to the opposite second side of the at least two channel elements, and
   wherein there is a recess in a peripheral wall of the channel which extends over the entire length of the channel so that lines can be inserted laterally into the channel through the recess thereby avoiding the need for the lines to be passed axially through the full length of the channel.

2. The cable guiding element as claimed in claim 1, wherein the peripheral wall of the channel has a closing element for closing of the recess.

3. The cable guiding element as claimed in claim 2, wherein the closing element for closing of the recess is connected to the channel.

4. The cable guiding element as claimed in claim 2, wherein the closing element, even in an opened state of the recess, is connected to the channel, the closing element being a slider or swivel part.

5. The cable guiding element as claimed in claim 4, wherein the closing element is a rotating crank which is guided in the peripheral wall of the channel, the rotating crank having an actuating lever.

6. The cable guiding element as claimed in claim 1, wherein at least one of the first and second channel elements has at least one holder for fixing the electrical lines.

7. The cable guiding element as claimed in claim 1, wherein at least one of the first and second channel elements has at least one hole for fixing the electrical lines.

8. The cable guiding element as claimed in claim 1, wherein the at least two cable channel elements each have a second end that has an articulated socket or head.

9. The cable guiding element as claimed in claim 8, further comprising
   at least one cable channel end piece that has an articulated head or socket, wherein the cable channel end piece and another end of the at least two cable channel elements together form a second joint via which the cable channel end piece and said one of the cable channel elements are connected to one another, wherein the second joint has a second channel for passage of the electrical lines, and wherein a second recess is provided in a peripheral wall of the second channel which extends over the entire length of the joint so that lines can be inserted laterally into the second channel through the second recess thereby avoiding the need for the lines to be passed axially through the full length of the second channel.

10. The cable guiding element as claimed in claim 9, wherein the cable channel end piece has at least one mounting section.

11. The cable guiding element as claimed in claim 1, wherein at least one of the cable channel elements has a cover that extends over the entire length of the cable channel element.

* * * * *